United States Patent [19]

Ueda et al.

[11] 4,417,810
[45] Nov. 29, 1983

[54] METHOD FOR OBTAINING A COMPOSITE COLOR PICTURE AND A CAMERA EMPLOYING THE SAME

[75] Inventors: Yoshihiro Ueda, Shiga; Yoshikazu Kimura, Kusatsu; Hiroyuki Yonehara; Kenjiro Tanabe, both of Hikone, all of Japan

[73] Assignee: Dainippon Screen Seizo Kabushiki Kaisha, Kyoto, Japan

[21] Appl. No.: 147,596

[22] Filed: May 7, 1980

[30] Foreign Application Priority Data

May 7, 1979 [JP] Japan .................. 54-55424

[51] Int. Cl.³ .................. G03B 27/58; G03B 27/52; G03B 27/32
[52] U.S. Cl. .................. 355/74; 355/40; 355/77
[58] Field of Search .................. 354/202 FF; 355/39, 355/40, 41, 77, 53, 63, 64, 74, 72

[56] References Cited

U.S. PATENT DOCUMENTS

| 1,033,404 | 7/1912 | Huebner ........................ 355/72 |
| 1,841,274 | 1/1932 | Ballard ........................ 355/77 |
| 2,494,077 | 1/1950 | Wilkinson ........................ 355/40 |
| 3,449,048 | 6/1969 | Allison ........................ 355/40 |
| 3,490,844 | 1/1970 | Sapp ........................ 355/77 X |
| 3,620,623 | 11/1971 | Reams et al. ........................ 355/53 |
| 3,768,903 | 10/1973 | Steinberger et al. ........................ 355/41 X |
| 3,837,742 | 9/1974 | Wally ........................ 355/54 |
| 4,056,711 | 11/1977 | Lamar ........................ 235/487 X |
| 4,076,413 | 2/1978 | Smeaton ........................ 355/77 X |
| 4,128,331 | 12/1978 | Nakamura ........................ 355/74 X |

Primary Examiner—Donald A. Griffin
Attorney, Agent, or Firm—Lackenbach, Siegel, Marzullo, Presta & Aronson

[57] ABSTRACT

A method for obtaining a composite color picture out of a plurality of original pictures and a camera employing the method are disclosed, wherein a plurality of original color picture are selectively exposed on a sheet of film one by one in a sequential manner with appropriate color compensation, magnification or reduction in size, and proper masking conducted upon each exposure. Both photographic film on which to duplicate composite picture and the original pictures are displaced across and on the optical center line of a camera in such a manner that, on the composite photographic picture thus obtained, the original pictures are laid out according to a plan.

14 Claims, 11 Drawing Figures

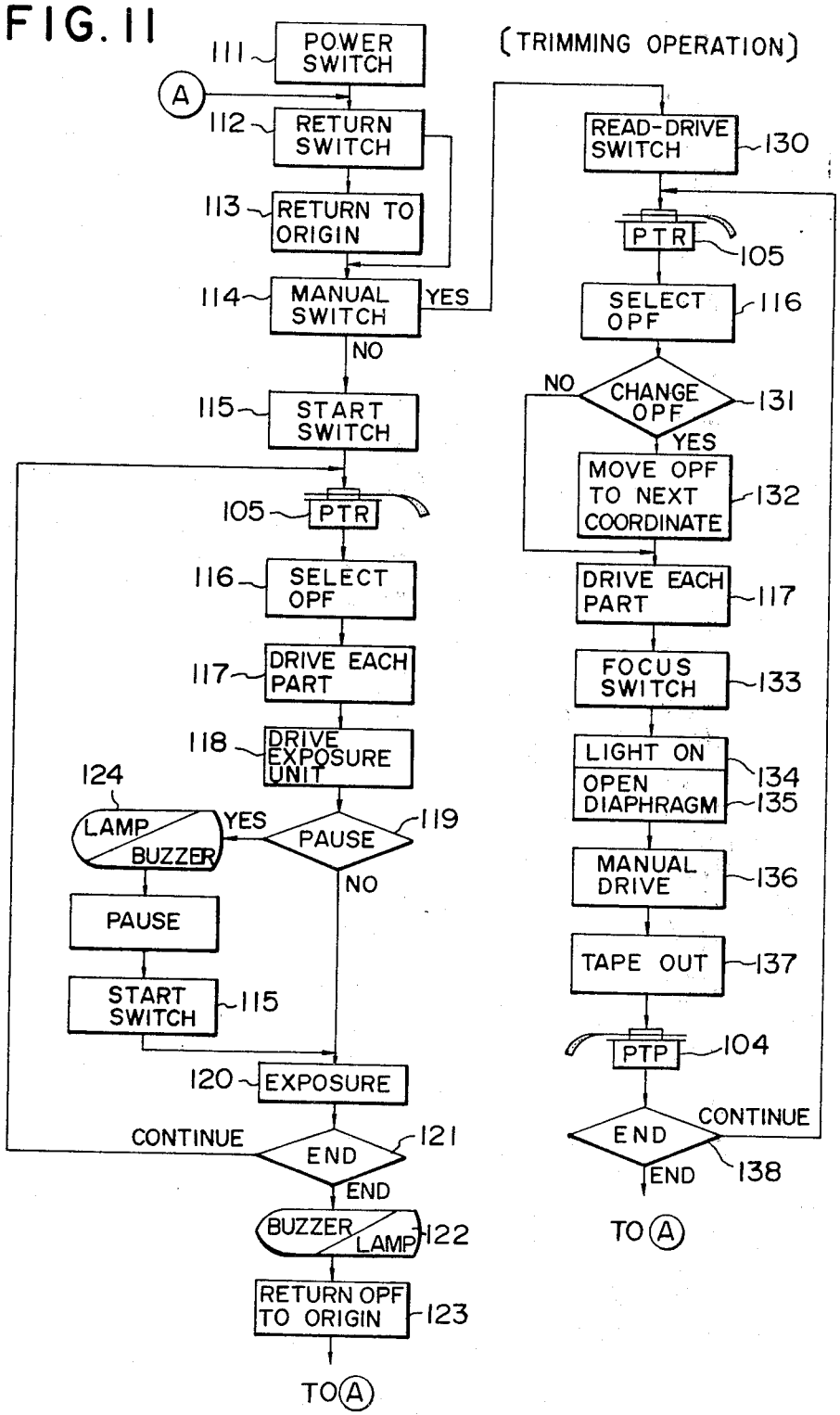

METHOD FOR OBTAINING A COMPOSITE COLOR PICTURE AND A CAMERA EMPLOYING THE SAME

BACKGROUND OF THE INVENTION

This invention generally relates to a method for obtaining a photographic picture in one or more colors from a plurality of original color pictures and a camera therefor, and more particularly to a method for obtaining a photographic composite color picture consisting of a plurality of original color pictures which are laid out on the composite color picture according to a plan out of a plurality of original color pictures and an automated camera therefor.

Such methods are adapted to obtaining a lay-out or composite color picture out of a plurality of original color pictures for various publications, catalogs, photograhic magazines, etc. In such cases, the original pictures are normally photographic color films, and the lay-out or composite color picture produced therefrom is then color separated and made into printing plates. Since the original pictures may have been taken under various conditions, color tone of each of the original pictures is generally not uniform from one orignal picture to another. And, in addition, it is often the case that the magnification or reduction scale ratio of each original picture to the lay-out picture must be varied from one original picture to another in order to obtain a satisfactory or desired size proportion in the finished lay-out picture.

Therefore, a lay-out picture obtained merely by laying out a plurality of original picture on a plane and exposing them on a photosensitive material in a single process is normally not satisfactory because of possible unevenness in color tone from one original picture to another, some may be reddish while others may be bluish as the case may be, as well as because of disproportion in picture sizes from one original picture to another.

According to a conventional method for obtaining such a lay-out picture, each original picture is photographically duplicated one by one with an appropriate color compensation by placing a color compensating filter between a camera for taking the picture and the original picture and, at the same time, at a suitable magnifying or reducing scale so that each original picture may have a suitable size proportion when they are laid out on a plate according to a desired arrangement. Then these duplicated film images are placed on a transparent base according to a lay-out plan and mounted on a process camera for plate making, for example, to serve as a secondary originary picture in which color tone and size proportions from one picture to another are already adjusted. And the picture taken by this camera may be used for preparing a halftone printing plate or the like after a necessary color separation and other processes.

However, this method is very time consuming in that each original picture has to be indivisually duplicated and their color tone and size proportions have to be adjusted one by one. And, these indivisual original pictures have to be manually laid out on the transparent base one by one.

As an alternative method, it is also possible to color separate the original pictures first with a suitable magnification or reducing factor and, then, to lay them out on a transparent base for picture taking with a process camera for plate making, for example.

According to this menthod, however, since the relative position of each of the original color separated images, when it is laid out on the transparent base, must exactly coincide for each of the color separated lay-out picture in order to avoid mis-register in the finished picture which seriously impairs the print quality of the finished picture, a great care and skill are demanded in laying out each original color separated picture on the transparent base and, even for a very skilled worker, it is a very time consuming work involving a very high cost.

There also is proposed a method in which each of the color separated indivsual film images which are to be laid out is, in this instance, exposed to a specified location on the photosensitive material of a process camera, one by one, at a desired magnifying or reducing scale according to a predetermined plan in the process of picture taking with a process camera for obtaining a halftone image. Yet, it involves a considerable difficulty in eliminating the aforementioned mis-register and is not very practical for actual application.

OBJECTS AND SUMMARY OF THE INVENTION

Accordingly, it is a principal object of this invention to provide a method for obtaining a lay-out color picture or composite color picture from a plurality of original color pictures with appropriate color compensations and magnification or reducing scale changes without requiring laborious or time consuming work and without involving any possibility of mis-register at a relatively low cost.

Another object of the invention is to provide a camera for carrying out the above-mentioned method in such a manner that each step of the method is sequentially conducted according to a programmed format and an operating personnel is required to do a minimum amount of work and only the work which is best performed according to human judgements.

According to the invention, such objects are accomplished by providing a method comprising the steps of mounting a plurality of original pictures on an original picture frame side by side, and repeating the following steps for each one of the original pictures; aligning the center of an original picture on the optical center line of the camera, aligning a desired point of the surface of the photosensitive material on the optical center line of the camera, setting a proper magnification factor as well as a proper masking arrangement over the photosensitive material, selectively actuating a color compensating means, and exposing the original picture image onto the photosensitive material with proper masking performed thereover.

And this method may be conveniently performed with an apparatus of the present invention which comprises a means for successively moving an original color pictures across the optical center of the camera, a light source for illuminating the color original picture which is placed on the optical center line of the camera, an original picture carriage provided with a color compensating means for compensating the color of the light from the light source, a lens carriage comprising an optical system for producing the image of the original color picture which is placed on the optical center line of the camera on its focal plane, an exposure control device, a cabinet which supports the photosensitive material slidably across the optical center line in such a manner that the photosensitive material is movable on the focal plane on which the image of the original picture is reproduced, an adjusting means for adjusting the distances of the original picture carriage and the lens carriage to the cabinet, and a central control means which centrally controls the displacements of the color pictures, the color compensating means, the exposure control device, the displacement of the photosensitive material, and the adjusting means.

According to another aspect of the invention, there is provided a light shielding mask means over the photosensitive material, and this masking means comprises, in addition to normal light shields, four flat bars, each neighboring pair forming a 90 degree angle, which define a rectangular opening through which light is allowed to transmit. And, the opposing side ends of the flat bars are shaped as knife edges and each neighboring pairs are engaged one over the other with their broader surfaces being contacted back to back. And these flat bars may be advanced toward the center or retracted away from the center in order to offer a rectangular opening whose shape and dimensions may be varied.

According to yet another aspect of the invention, the camera is provided with a central control means provided with instruction storing means and a keyboard for storing and receiving instructions as well as a monitor TV for displaying the content of the instructions in numerical values and schematic diagrams for the convenience of an operating personnel. And, at least most of sequential actions of the camera are automatically conducted.

BRIEF DESCRIPTION OF THE DRAWINGS

FIG. 11 is a simplified flow chart for the operation and actions in an exemplary embodiment of the camera according to the invention.

Figure 1:
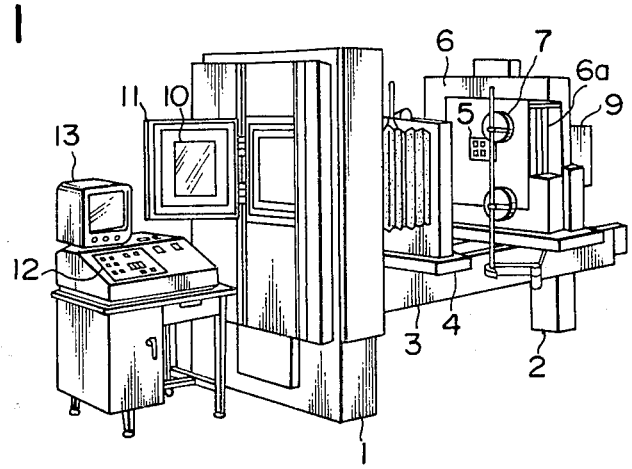
FIG. 1 is a perspective view of the camera for photographically producing a lay-out picture from a plurality of color original pictures.

In reference to FIG. 1, according to the embodiment shown in the drawing, the camera is shown to be similar to a normal floor type process camera for plate making having a cabinet 1, and base supports 2 horizontally supporting the frame 3, as well as a lens carriage 4 and an original picture carriage which are disposed slidably on and along the frame 3.

To the original picture carriage 6 is mounted an original picture holder 18 as well as a light source 9 for transmitted light and a light source 7 for reflected light.

The cabinet 1 is provided with a film holder 11 which flatly retains duplicating film 10 with vacuum suction and which is disposed slidably in both vertical and horizontal directions with respect to the cabinet 1 and, in addition, a masking device 14 is arranged over the film holder surface on the side which faces the lens carriage.

And, a control panel 12 and a monitor TV screen 13 is set up near the cabinet 1.

The lens carriage 4 is provided with a set of lenses 15 equipped with a shutter device 17 having a shutter 17a and an exposure device 16 with a diaphragm 16a for restricting the amount of light passing therethrough by adjusting its opening amount.

The lens carriage 4 and the original picture carriage 6 are adapted to slide along the frame by means of a pair of screw rods 8 driven by the motors $M_1$ and $M_2$, which are mounted in the cabinet 1, according to a desired magnifying scale and a proper focus setting.

Figure 3:
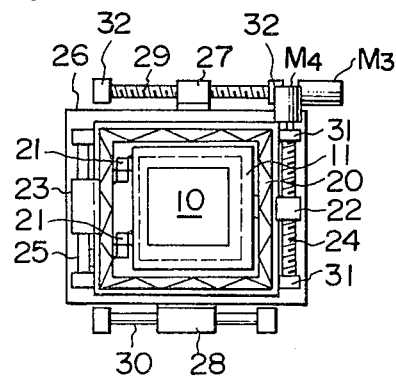
FIG. 3 is a front view of the horizontally slidable frame of the film holder.

FIG. 3 shows the drive mechanism for the vertical and horizontal motion of the film holder 11.

The film holder 11, which is of a known vacuum suction type, flatly retains film with vacuum suction provided from a plurality of small holes formed in the retaining surface of the film holder 11. This film holder is hinged to the vertically slidable frame 20 with hinges 21 in such a manner that the cabinet 1 may be opend up as shown in FIG. 1 when loading or unloading film to or out from the cabinet 1.

On each side of the vertically slidable frame 20, a drive screw 24 or a guide rod 25 is arranged, engaged with a nut 22 or a guide carriage 23, spanning the vertically slidable frame 20 in such a manner that the vertically slidable frame 20 may be slidingly displaced vertically by turning the drive screw 24, which is supported by bearings 31 at each of its ends, with the motor $M_4$.

The horizontally slidable frame 26 also is provided with a nut 27 and a guide carriage 28 which engage to a drive screw 29 and a guide rod spanning the horizontally slidable frame 26, respectively, in such a manner that the frame 26 may be slidably displaced in a horizontal direction by turning the drive screw 29, which is supported by bearings 31 at each of its ends, with the motor $M_3$.

With such vertical and horizontal displacements of the film holder 11 combined together, a desired section of film 10 mounted in the film holder may be aligned to the optical center line O of the camera.

Figure 4:
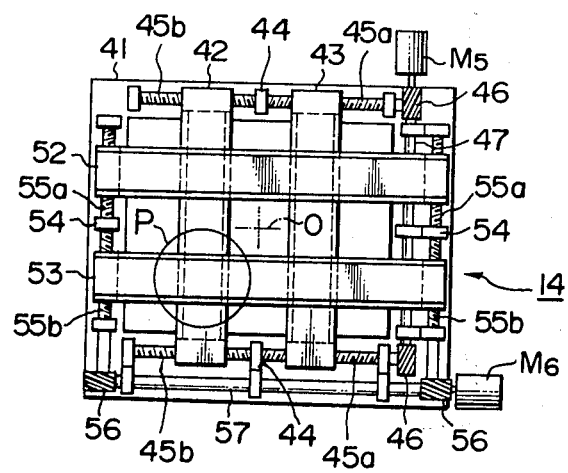
FIG. 4 is a front view of the masking device which is placed over the photosensitive material.

FIG. 4 shows the masking device 14 as seen from the side of the film holder 11.

Along the sides of the masking frame 41 are mounted screw rods 45 and 55 pivotally supported by bearings 44 and 54, respectively.

The screw rods 45 mounted along the vertically opposing sides of the masking frame 41 are driven, in parallel, by the motors $M_5$ through worm grears 46 and a drive shaft 47. The screw rods 55 mounted along the horizontally opposing sides of the masking frame 41 also are driven, in parallel, by the motor $M_6$ through worm gears 56 and a drive shaft 57 in a like manner.

Each of the screw rods 45 and 55 is provided with a thread which is reversed in its direction at the center of the screw rod where it is supported with a bearing 44 or 54, and each end of the masking flat bars 42, 43, 52, and 53 is engaged with a corresponding section of the screw rods 45 and 55.

Therefore, each of the masking flat bars 42 and 43 may be closed or opened about a vertical line of symmetry of the masking frame 41 by driving the motor $M_5$. And, likewise, the masking flat bars 52 and 53 may be opened and closed vertically about a horizontal line of symmetry of the masking frame 41 by driving the motor $M_6$.

Since the four masking flat bars 42, 43, 52, and 53 are so arranged that each neighboring pair of the masking flat bars are perpendicular to one another, a rectangular opening with arbitrary dimensions and an arbitrary shape may be obtained by opening or closing the two pairs of the masking plates as described above.

Figure 5:
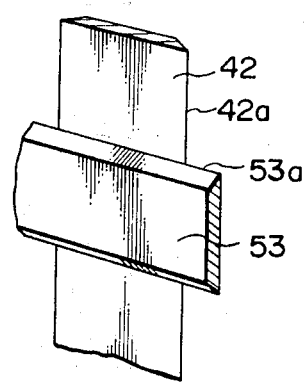
FIG. 5 is a expanded view of the part P in FIG. 4.

And, since the fringes of each masking flat bar is shaped as knife edges 42a and 53a, as shown in detail in FIG. 5, with the broader surfaces of the flat bars contacting one another back to back, there will arise no dimensional error due to the thickness of the masking flat bars with respect to the incident light beam which is projected at some angle other 90 degrees with respect to the plane of projection particularly near the fringes.

Figure 6:
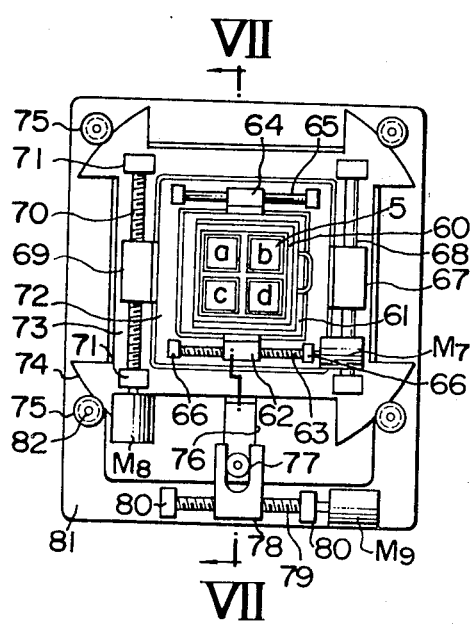
FIG. 6 is a front view of the original picture carriage comprising a rotary frame, horizontally slidable frame, and a vertically slidable frame.
Figure 7:
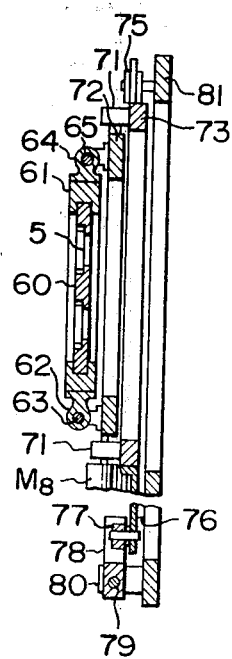
FIG. 7 is a cross sectional view taken along the line VII—VII of FIG. 6.
Figure 8:
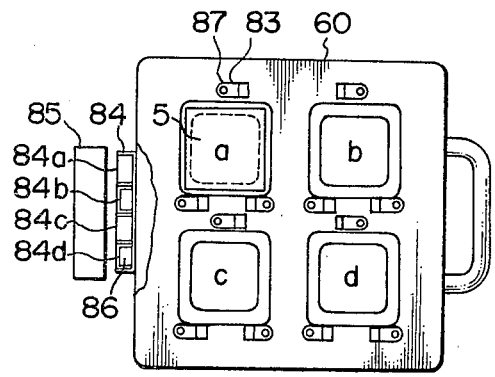
FIG. 8 is a front view of the original picture frame showing also the indicator means and the detector means for identifying the particular original picture frame which is presently being used.

FIG. 6 is a front view of the original picture holder 18 while FIG. 7 is a cross sectional view thereof taken along line VII—VII in FIG. 6, and FIG. 8 shows an expanded view of the original picture holder.

In reference to FIGS. 6 through 8, the original picture holder 60 may be mounted, with a plurality of color original pictures 5 (there are four original pictures shown in the drawing.) arranged on a single plane side by side therein, into the horizontally extending grooves provided on the inner opposing surfaces of the upper and the lower portion of the horizontally slidable frame 61 from the slot 6a (FIG. 1). The horizontally slidable frame 61, which is supported on a nut 62 and a fuide carriage 64 which are in turn respectively supported by bearing 71 and a guide rod 68, respectively, arranged in a vertically extending manner on a rotary frame 73, may be vertically displaced by driving the feed screw 70 with the motor $M_8$ in a similar way to the horizontally slidable frame 61.

The rotary frame 73 is provided with a sector 74 formed out of a single circle at each of its four corners and, with each sector being held in a rolling contact with one of four guide rollers 75 pivotally mounted on a fixed frame 81 with pivots 82, is rotatively supported. And, in addition, an arm 76 with a pin 77 planted at its free end portion is fixedly provided on the lower portion of the rotary frame 73 in a projecting manner.

To the lower end of the fixed frame 81 is pivotally mounted a horizontally extending screw rod 79, supported by bearings 80, to which a fork 78 is engaged with its female screw thread, and, with the pin 77 engaged in the fork 78, the rotary frame 73 may be rotated by driving the screw rod 79 with the motor $M_9$.

Referring now to FIG. 8, there is shown the original picture frame 60 provided with four mounting plates a through d for original pictures. In the drawing, on each of the film mounting plates, there are shown three film retaining means each consisting of a plate spring 83 and a pin 87 to which the plate spring is pivotally attached for retaining a sheet of original picture film. And, on the left side of the drawing, an arrangement for identifying the original picture frame is shown.

To be specific, the original picture identifying arrangement includes a detector 85 consisting of a plurality of proximity switches fixedly mounted on the side of the horizontally slidable frame 61, an indicator holder 84 mounted on the fringe of the original picture frame 60 and provided with cells 84a through 84d each opposing one of the proximity switches, and an indicator 86 consisting of from one to four magnets selectively placed in the cells of the indicator holder 84.

It is thus made possible to identify the original picture frame 60 which is presently being used when it is loaded into the horizontally slidable frame 61 in exchange for another out of a plurality of original picture frames 60 each containing a different set of original color pictures from the signal transmitted from the proximity switches which are opposing the corresponding cells of the indicator holder 84 containing different number of magnets in different arrangement from one original picture frame to another.

According to the embodiment shown in the drawing where the number of the proximity switches and the cells in the indicator holder is four, it is possible to distinguish or identify as many as 15 original pucture frames.

Figure 9:
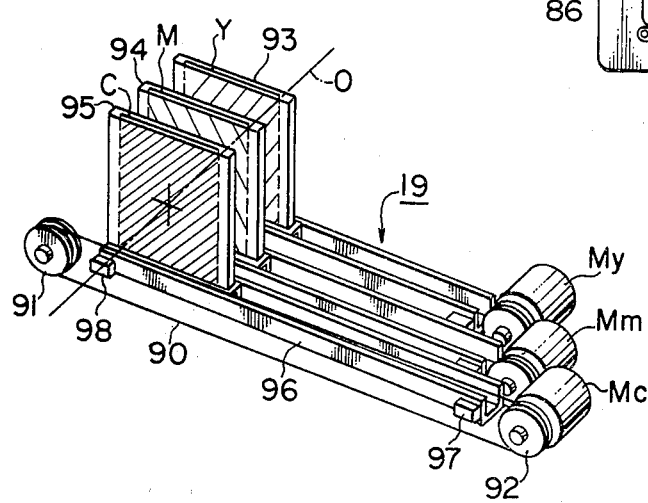
FIG. 9 is a partly cut away view of the filter device.

FIG. 9 is a perspective view showing the structure of the filter device 19 (Refer to FIG. 2.) incorporated in the original picture carriage 6.

Figure 2:
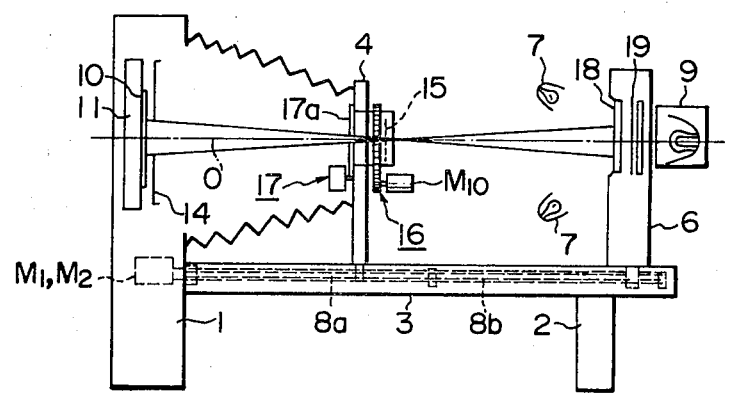
FIG. 2 is a schematic longitudinal sectional view of the camera for showing the general structure of the camera according to the invention.

This device is intended for correcting any distortion in the color tone of the original picture to be duplicated by illuminating the original picture with yellow-, magenta-, or cyan-colored light for effecting a certain color compensation at the time of exposure and, to that end, desired clolor filters (color compensating filters) may be selectively mounted in the filter device 19 arranged between the light source and the original picture as shown in FIG. 2.

Each of these three color filters, yellow Y, magenta M, and cyan C filters, is placed into a corresponding one of three transparent cases 93, 94, and 95 which are vertically fixed to carriages which are, in turn, in sliding engagement with guide rails 96 with grooves therein in such a manner that each filter may be slidable along the rail 96 driven by a cable 90 stretched around pulleys 91 and 92 arranged on the ends of the rail 96.

Desired combination of color filters may thus be placed on the optical center line O of the camera by sliding the transparent cases along the guide rails 91 by means of the cables 90 and the pulleys 91 and 92 which may be driven by the motors $M_y$, $M_m$, and $M_c$.

Each of the guide rails 91 is provided with limit switches 97 and 98 at its both ends for limiting the travelling stroke of a corresponding filter.

Figure 10:
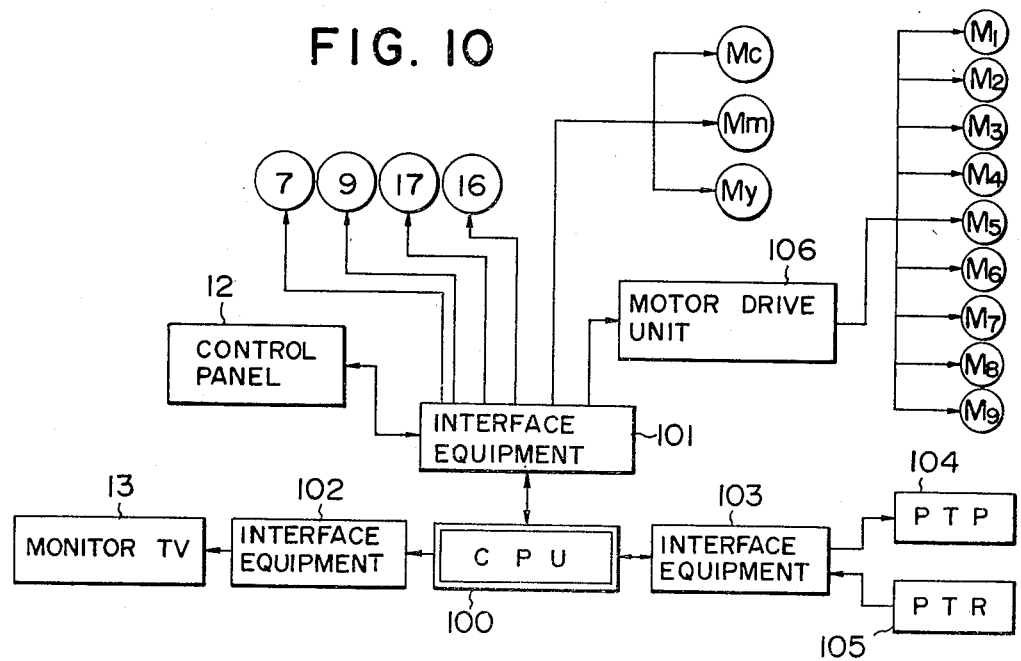
FIG. 10 is a block diagram for showing an example of electrical connections in the camera according to the present invention.

FIG. 10 is a block diagram of an electronic or electric control device for controlling the duplicating camera for combining a plurality of original color pictures according to the invention.

The control panel 12, the light source 9 for transmitted light, the light source 7 for reflected light, the shutter 17, the motor $M_{10}$ for the exposure device 16, the motors $M_c$, $M_m$, and $M_y$ for the filter device 19, and, via a motor drive unit 106, the motors $M_1$ through $M_9$ are all connected to the interface equipment 101 and further to a central processing unit 100 (hereinafter referred to as CPU) comprising an electronic computer.

And, a monitor TV 13 is connected to the CPU 100 via another interface equipment 102. Likewise, a paper tape perforator 104 (hereinafter referred to as PTP) and a paper tape reader 105 (hereinafter referred to as PTR) are connected to the CPU through a third interface equipment 103.

Operating instructions are given from various operating button switches on the control panel as well as from the reading at the PTR 105. And, the PTP 104 is for perforating tape according to a format programmed from the control panel 12 or, in particular, the keyboard thereon, and the tape thus perforated is used for the automatic operation of the camera. The monitor TV 13 is used for the convenience of an operating personnel in checking such programs by providing various numerical and graphical displays to him.

FIG. 11 shows a simplified flow chart concerning the operation and action of the camera, the details of which will be explained in what follows.

First of all, the magnification scale ratios of the film image to be duplicated to the original picture images, numbers indicating the sequence of exposure setting, serial numbers of the original picture frames (abbreviated as OPF in the drawing), factors by which to multiply the basic exposure setting values, color compensating data on cyan, magenta, and yellow, image positions, image sizes, existence of any pauses desired, etc. are all instructed to the CPU 100 from the keyboard (not shown in the drawing) on the control panel 12 (FIG. 1) through the interface equipment 101. Then, these instructions are repeated for each exposure on the film 10.

Then, the instructions are displayed on the monitor TV 13 in numerical values and graphs to make sure that the instructions are all in accordance with a plan and, after correcting any errors by keyboard operation, tape is perforated out from the PTP 104 according to the instructions.

Simultaneously, the first original picture frame 60 out of a plurality of them containing a desired set of original pictures 5, which are prepared in advance, is mounted inside the cabinet 1. If there is utilized an automatic original picture frame changer which is capable of changing the original picture frames according to a pre-set sequence, a desired number of original picture frames should be mounted therein as a matter of course.

After above described prepartion is completed, actual exposure process may be started. With the switch 111 for power supply turned on, pressing of the return button 112 will cause the automatic return to origin (113) of the filter device 19, the exposure device 16, the film holder, the original picture carriage 6, and the lens carriage 4.

Then, if the start button switch 115 is turned on with the trimming automatic selection switch 114 selected at "automatic", the PTR 105 will start reading the tape which has been perforated as described above and it will be checked if a correct original picture frame 60 is mounted or not.

If an automatic original picture frame changer is used, selection of an original picture frame (116) will be made according to the instruction given in the tape. Subsequently, driving of each part (117) will be started. "Driving each part" here means that the selection of filters in the filter device 19, the positioning of specified original color picture 5 in the original picture frame 60 on the optical center line O of the camera, the positioning of the original picture carriage 6 and the lens carriage 4 according to a specified magnification factor (proper focusing may be automatically obtained at this time), positioning of the masking flat bars 42, 43, 52, and 53 of the masking device 14, and the positioning of the film holder 11 are all made by driving the motors $M_1$ through $M_9$, $M_c$, $M_m$, and $M_y$.

Then, the driving of the exposure device 16 (118) is made by driving the motor $M_{10}$ according to the magnification factor and other factors concerning the intensity of light emitted from the original picture 5 and varying the exposure setting by adjusting the opening amount of the diaphragm 16a in the exposure device 16.

With the above driving processes completed and there existing "pause" (119) instructions given in the tape, the operation of the camera may be temporarily suspended accompanied by sounding of the buzzer and lighting of the lamp (124). In the means time, the operator places a cut-out mask or the like over the film 10. If there is no such pause signal programmed in the perforated tape, exposure 120 will be repeated without interruption.

For this exposure process 120, various instructions required for various procedures are already programmed in the tape. In other words, various decisions, such as to use reflected light or transmitted light, to perform color compensation or not, and, if color compensation is needed, to conduct an exposure process without a filter followed by exposures with filters, are all programmed in the tape. Therefore, after an exposure without a filter, filters may be selected by driving the motors $M_c$, $M_m$, and $M_y$ for the following exposures. In each instance, the light source 9 and the shutter 17 will be actuated.

Thus, the picture taking of the first original picture in the original picture frame is completed at "end" 121.

Subsequently, the PTR 105 starts reading further instructions concerning the succeeding original pictures from the perforated tape and the execution of the steps 116 through 121 in the flow chart in FIG. 11 will be repeated.

When the picture taking of the last original picture is completed at step 121, the "end" buzzer 122 will be sounded and the original picture frame 60 will return to the origin (123), or its original position. Then, after replacing the original picture frame 60 mounted in the original picture carriage 6, a new picture taking process may be started by returning to A; i.e. to step 112.

At this moment, if a wrong original picture frame is mounted in the original picture carriage 6, the conflict to the instruction will be detected in the original picture selection step 116 preceeding a new picture taking process, and the operator will be warned by a lamp and a buzzer (not shown in the drawings) on the control panel 12. The selection of the original picture is checked for its correctness by the detector 85 which detects the combination and the number of indicators in the indicator holder 86 as shown in FIG. 8.

In this way, every original picture in each of the original picture frames is automatically exposed onto a sheet of film 10 mounted in the film holder 11 in a successive sequence.

If a certain original picture requires to be trimmed, then, after opening the film holder without loading it with film and setting a focal glass (not shown in the drawings) on the focal plane of the camera, the manual-automatic trimming selection switch 114 is set to "manual".

When the read-drive switch 130 is pressed, then the PTR 105 will be driven and start reading instructions from the tape for a desired original picture frame selection step 116.

The need for changing the original picture 5 will be detected in step 131, "change the original picture", and, if an original picture is needed to be changed, then the original picture frame 60 will be moved away by the motors $M_7$ and $M_8$ to make a room for another original picture on the optical center line of the camera.

After step 117, "drive each part", is performed and accomplished, turning on the focus switch 133 will automatically initiate steps 133 and 134 in which the light source 7 and/or 9 is lighted up and the shutter 17a is opened up. At this moment, the exposure device 16 is activated and the diaphragm 16a in the exposure device is brought to its most wide open state.

Then, the operator, while looking at the picture reflected on the focal glass, moves the original picture frame not only vertically and horizontally but also rotatively to bring it to a desired position by pushing the keys on the control panel 12 and driving the motors M7, M8, and M9 in "manual drive" 136 mode.

In addition, the masking flat bars 42, 43, 52, and 53 may be moved wider apart (by 10 mm, for example) from their specified opening amount by pushing the mask relieving switch (not shown in the drawing) on the control panel so as to allow the operator to be able to distinguish the fringes of the original picture 5 from the fringes defined by the masking flat bars in order to reduce any possibility of misjudgement.

After the trimming operation, new paper tape is perforated on the PTP 104 by pushing the tape-out switch 137 on the control panel.

This new paper tape in which all the data concerning the trimming of each of the original pictures is contained is next set on the PTR 105 and, by pressing the return switch 112 again after removing the focal glass and mounting new film 10 in the film holder 11, the subsequent picture taking will be automatically initiated with the new film 10.

Also, with this camera, a mask for laying out a picture over another picture can be prepared.

To be specific, after mounting monochromatic film in the vacuum suction type film holder 11 and specifying the exposure setting for desired masking film from the keyboard on the control panel 12 for producing instruction tape on the PTP 104, the tape containing the instructions concerning the preparation of the masking film is set on the PTR 105 for initiating a series of exposure processes for preparing the desired masking film.

With the duplicating camera according to the present invention, composite duplicated film combining a plurality of original pictures may thus be automatically produced in a short time precisely according to a predetermined plan without requiring any special skill or expertise.

Furthermore, the duplicated film thus produced does not required to be color separated for each of its individual original pictures in the subsequent process and the high skill and the time consuming work in laying out each original picture are not required according to the camera of the present invention with which color separation may be made in one operation.

Therefore, since the operating time of an expensive color separation device may be considerably reduced, the economy of total cost as well as time in producing printing plate are extremely great and, in addition, since the perforated tape may be conveniently preserved for later use, the reproduction of duplicated film, in case it is damaged or destroyed, is very simple.

It should be mentioned also that, with the duplicating camera according to the present invention, masking film which has been conventionally produced using strip film may also produced with the same camera.

And, the color compensating means, consisting of a plurality of color compensating filters, which was used in the above described embodiment may equally well be a color head of a known color light mixing type.

The invention has been described in detail with particular reference to preferred embodiments thereof, but it will be understood that variations and modifications can be effected within the spirit and scope of the invention.

We claim:

1. A duplicating camera for producing a color composite picture out of a plurality of original color pictures with a desired layout arrangement, comprising,
   an original picture frame holding a plurality of original color pictures side by side on a single plane,
   an original picture carriage supporting the original picture frame in a direction perpendicular to the plane on which the original pictures are mounted,
   rotation means for rotatably supporting said frame at corners thereof to permit rotation of said pictures about an axis normal to said plane,
   a means for successively moving the original picture frame across the optical center line of the duplicating camera, said rotation means supporting said moving means and being configured for clearance of said moving means to permit independent operation of said rotation means and said moving means while said original picture is oriented normally to said axis,
   a light source for illuminating the color original picture which is placed on the optical center line,
   a lens carriage comprising an optical system for producing the image of the original picture which is placed on the optical center line of the camera on its focal plane,
   an exposure control device,
   a cabinet which supports photosensitive material on the focal plane of the duplicating camera in such a manner that a desired point on the photosensitive material may be aligned on the optical center line of the duplicating camera for each of the original pictures,
   a masking device having a variable light transmitting area over the photosensitive material surface having the lens carriage,
   the masking device being provided with a light shielding screen which may be extended to or retracted from the central portion of the masking device on each side of the frame of the masking device,
   the forward end of the light shielding screen being provided with a flat bar having knife edges, each pair of the neighboring flat bars with knife edges being slideably engaged one over another with their broader surfaces contacting back to back, and
   a color compensating means adapted to be selectively actuated for each of the original pictures.

2. A duplicating camera according to claim 1, comprising a masking device having a variable light transmitting area over the photosensitive material surface facing the lens carriage.

3. A duplicating camera according to claim 2, wherein the masking device is provided with a light shielding screen which may be extended to or retracted from the central portion of the masking device on each side of the frame of the masking device.

4. A duplicating camera according to claim 3, wherein the forward end of the light shielding screen is provided with a flat bar having knife edges, each pair of the neighboring flat bars with knife edges being slidably engaged one over another with their broader surfaces contacting back to back.

5. A duplicating camera according to claim 1, wherein a plurality of original color pictures are placed on a planar original picture frame, side by side, which is detachably mounted on the original picture carriage.

6. A duplicating camera according to claim 5, wherein a plurality of original picture frames are successively replaced from one to another upon completion of picture taking with respect to each of the original picture frames.

7. A duplicating camera according to claim 6, wherein a plurality of original picture frames are successively replaced from one to another upon completion of picture taking with respect to each of the original picture frames.

8. A duplicating camera according to claim 7, wherein each of the original picture frames is provided with an indicator means while the original picture carriage is provided with a detector means which is adapted to cooperate with the indicator means for the identification of the original picture which is presently mounted on the original picture carriage.

9. A duplicating camera for producing a color composite picture out of a plurality of original color pictures with a desired lay-out arrangement, comprising,
an original picture frame holding a plurality of original color pictures side by side on a single plane,
an original picture carriage supporting the original picture frame in a direction perpendicular to the plane on which the original pictures are mounted,
a means for successively moving the original picture frame across the optical center line of the duplicating camera,
a light source for illuminating the color original picture which is placed on the optical center line,
a lens carriage comprising an optical system for producing the image of the original picture which is placed on the optical center line of the camera on its focal plane,
an exposure control device,
a cabinet which supports photosensitive material on the focal plane of the duplicating camera in such a manner that a desired point on the photosensitive material may be aligned on the optical center line of the duplicating camera for each of the original pictures,
a color compensating means adapted to be selectively actuated for each of the original pictures,
there being a plurality of original color pictures placed on said original picture frame, side by side, said original picture frame being detachably mounted on the original picture carriage,
a plurality of original picture frames being successively replaced from one to another upon completion of picture taking with respect to each of the original picture frames,
each of the original picture frames being provided with indicator means while the original picture carriage is provided with a detector means which is adapted to cooperate with the indicator means for the identification of the original picture which is presently mounted on the original picture carriage, and
wherein the indicator means comprises an indicator holder having a plurality of cells in which indicators are placed selectively in number and arrangement while the detector means comprises the same number of detectors as the cells in the indicator means arranged on the original picture carriage in such a manner that each of the detectors opposes a corresponding one of the cells in the indicator holder one to one.

10. A duplicating camera according to claim 9, wherein the indicator is a magnet and the detector is a magnetic sensor.

11. A duplicating camera according to any one of claims 1 through 10, wherein at least most of the actions of the camera are performed according to instructions stored in a memory means.

12. A duplicating camera according to claim 11, wherein the memory means is perforated paper tape.

13. A duplicating camera according to claim 12, wherein a TV monitor is set up near the camera for displaying the content of the instructions stored in the perforated paper tape.

14. A duplicating camera according to any one of claims 1 through 13, wherein the original picture carriage comprises a means for adjustably rotating the original picture frame about an axis parallel to the optical center line.

* * * * *